(12) United States Patent
Nihei et al.

(10) Patent No.: US 12,495,145 B2
(45) Date of Patent: Dec. 9, 2025

(54) INFORMATION PROCESSING SYSTEM, INFORMATION PROCESSING METHOD, AND INFORMATION PROCESSING APPARATUS

(71) Applicant: NEC Corporation, Tokyo (JP)

(72) Inventors: Koichi Nihei, Tokyo (JP); Yoshifumi Onishi, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/580,009

(22) PCT Filed: Sep. 30, 2021

(86) PCT No.: PCT/JP2021/036256
§ 371 (c)(1),
(2) Date: Jan. 17, 2024

(87) PCT Pub. No.: WO2023/053394
PCT Pub. Date: Apr. 6, 2023

(65) Prior Publication Data
US 2024/0333928 A1    Oct. 3, 2024

(51) Int. Cl.
*H04N 19/119* (2014.01)
*H04N 19/139* (2014.01)
(Continued)

(52) U.S. Cl.
CPC ......... *H04N 19/119* (2014.11); *H04N 19/139* (2014.11); *H04N 19/172* (2014.11); *H04N 19/196* (2014.11)

(58) Field of Classification Search
CPC .. H04N 19/119; H04N 19/139; H04N 19/172; H04N 19/196
(Continued)

(56) References Cited

U.S. PATENT DOCUMENTS

| 2015/0063461 | A1* | 3/2015 | Zheng | H04N 19/14 |
| | | | | 375/240.24 |
| 2017/0302719 | A1* | 10/2017 | Chen | H04L 65/61 |

(Continued)

FOREIGN PATENT DOCUMENTS

| JP | H09-75404 A | 3/1997 |
| JP | 2002-165222 A | 6/2002 |

(Continued)

OTHER PUBLICATIONS

International Search Report for PCT Application No. PCT/JP2021/036256, mailed on Dec. 21, 2021.

*Primary Examiner* — Allen C Wong
(74) *Attorney, Agent, or Firm* — Sughrue Mion, PLLC

(57) ABSTRACT

An information processing system (1) includes: acquisition means (11) for acquiring, regarding a frame of a video image distributed via a network, information indicating vectors of movements regarding respective subareas obtained by dividing the frame of the video image into a plurality of areas; estimation means (12) for estimating a position of an area of a specific part of a subject in the frame of the video image based on the information indicating the vectors of the movements acquired by the acquisition means; and control means (13) for causing a coding parameter to be set for the frame of the video image based on the position of the area of the specific part estimated by the estimation means.

18 Claims, 12 Drawing Sheets

(51) Int. Cl.
*H04N 19/172* (2014.01)
*H04N 19/196* (2014.01)

(58) Field of Classification Search
USPC .................................................. 375/240.16
See application file for complete search history.

(56) References Cited

U.S. PATENT DOCUMENTS

2021/0103751 A1\* 4/2021 Lee ...................... G06V 10/454
2021/0192217 A1\* 6/2021 Wang ................... G06V 10/764

FOREIGN PATENT DOCUMENTS

| | | |
|---|---|---|
| JP | 2003-093354 A | 4/2003 |
| JP | 2004-227519 A | 8/2004 |
| JP | 2007-306305 A | 11/2007 |
| JP | 2012-239085 A | 12/2012 |
| WO | 2017/104011 A1 | 6/2017 |

\* cited by examiner

| ANALYSIS TARGET | SPECIFIC PART |
|---|---|
| HEART RATE | FACE |
| RESPIRATORY RATE | UPPER BODY |
| BLOOD PRESSURE | FACE |
| ... | ... |

Fig. 6

INFORMATION PROCESSING SYSTEM, INFORMATION PROCESSING METHOD, AND INFORMATION PROCESSING APPARATUS

This application is a National Stage Entry of PCT/JP2021/036256 filed on Sep. 30, 2021, the contents of all of which are incorporated herein by reference, in their entirety.

TECHNICAL FIELD

The present disclosure relates to an information processing system, an information processing method, and an information processing apparatus.

BACKGROUND ART

Attention has been focused on techniques for collecting information detected by a sensor via a network and determining a situation of a target based on the collected information.

With regard to the above technique, Patent Literature 1 discloses a technique for capturing an image (a still image) of a patient's affected part using an image-capturing apparatus for medical use and transferring data of the image of the affected part that has been captured to a portable information terminal held by a medical specialist who is in a remote location, so that the medical specialist can recognize the condition of the affected part.

Further, Patent Literature 2 discloses a remote medical system that allows a doctor to examine a patient while the doctor and the patient are having a conversation with each other, in which a selected area set in a video image of the patient is moved in accordance with the patient's movements, which enables the doctor to continue to examine the affected part without losing sight of it. In Patent Literature 2, in order to extract information on movements from video image data, changes in pixels at the same position between a previous screen and the current screen are compared at regular intervals. Then, correlation calculations are performed for changes in pixels at the same position across the entire screen, and the changes in the movements on the screen are quantitatively measured depending on the degree to which the correlation values between the previous screen and the current screen change.

CITATION LIST

Patent Literature

[Patent Literature 1] Japanese Unexamined Patent Application Publication No. 2003-093354
[Patent Literature 2] Japanese Unexamined Patent Application Publication No. H09-075404

SUMMARY OF INVENTION

Technical Problem

However, in Patent Literature 1, a case in which an analysis is performed based on a video image has not been discussed. Further, in Patent Literature 2, there is a problem that it is not possible to perform an analysis with a certain degree of accuracy if the quality of the image of the area of the affected part in the video image is not sufficiently high.

In view of the aforementioned problem, an object of the present disclosure is to provide a technique capable of appropriately distributing a video image of an area of a specific part of a subject used for testing (analysis, estimation, inference, or medical examination).

Solution to Problem

In a first aspect according to the present disclosure, an information processing system includes: acquisition means for acquiring, regarding a frame of a video image distributed via a network, information indicating vectors of movements regarding respective subareas obtained by dividing the frame of the video image into a plurality of areas; estimation means for estimating a position of an area of a specific part of a subject in the frame of the video image based on the information indicating the vectors of the movements acquired by the acquisition means; and control means for causing a coding parameter to be set for the frame of the video image based on the position of the area of the specific part estimated by the estimation means.

Further, in a second aspect according to the present disclosure, an information processing method executing: processing for acquiring, regarding a frame of a video image distributed via a network, information indicating vectors of movements regarding respective subareas obtained by dividing the frame of the video image into a plurality of areas; processing for estimating a position of an area of a specific part of a subject in the frame of the video image based on the information indicating the vectors of the movements acquired in the acquiring processing; and processing for causing a coding parameter to be set for the frame of the video image based on the position of the area of the specific part estimated in the estimating processing is provided.

Further, in a third aspect according to the present disclosure, an information processing apparatus includes: acquisition means for acquiring, regarding a frame of a video image distributed via a network, information indicating vectors of movements regarding respective subareas obtained by dividing the frame of the video image into a plurality of areas; estimation means for estimating a position of an area of a specific part of a subject in the frame of the video image based on the information indicating the vectors of the movements acquired by the acquisition means; and control means for causing a coding parameter to be set for the frame of the video image based on the position of the area of the specific part estimated by the estimation means.

Advantageous Effects of Invention

According to one aspect, it is possible to appropriately distribute a video image of an area of a specific part of a subject used for testing.

BRIEF DESCRIPTION OF DRAWINGS

FIG. 6 is a diagram showing one example of a specific part DB according to the example embodiment;

EXAMPLE EMBODIMENT

Principles of the present disclosure are described with reference to several example embodiments. It should be understood that these example embodiments are set forth for purposes of illustration only and that those skilled in the art will assist in understanding and practicing the present disclosure without suggesting limitations on the scope of the present disclosure. The disclosure described herein may be implemented in various methods other than those described below.

In the following description and claims, unless otherwise defined, all technical and scientific terms used herein have the same meaning as commonly understood by one of those skilled in the art of technology to which the present disclosure belongs.

Hereinafter, example embodiments of the present disclosure will be described with reference to the drawings.

First Example Embodiment

<Configuration>

Figure 1A:
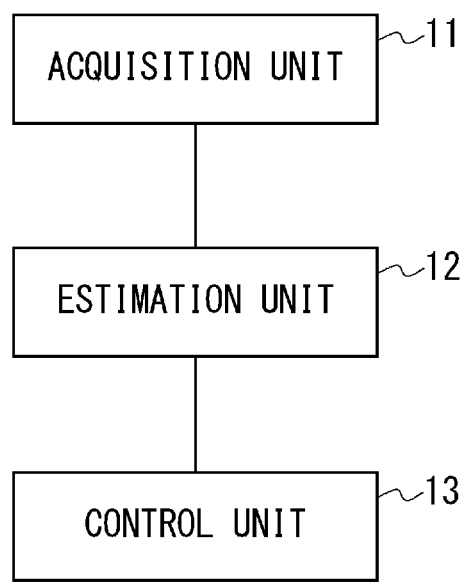
FIG. 1A is a diagram showing one example of a configuration of an information processing system according to an example embodiment.

Referring to FIG. 1A, a configuration of an information processing system 1 according to an example embodiment will be described. FIG. 1A is a diagram showing one example of a configuration of the information processing system 1 according to the example embodiment. The information processing system 1 includes an acquisition unit 11, an estimation unit 12, and a control unit 13.

The acquisition unit 11 receives (acquires) various kinds of information from a storage unit inside an apparatus, or from an external apparatus. Further, the acquisition unit 11 may receive an image from the image-capturing apparatus 20 built into apparatus via an internal bus. Further, the acquisition unit 11 may receive the image from an external (externally attached) image-capturing apparatus 20 connected by a cable or the like via an external bus (e.g., a Universal Serial Bus (USB) cable, a High-Definition Multimedia Interface (HDMI) (registered trademark) cable, or an SDI cable). In this case, the external bus may include, for example, a Universal Serial Bus (USB) cable, a High-Definition Multimedia Interface (HDMI) cable, or a Serial Digital Interface (SDI) cable).

Further, the acquisition unit 11 acquires, for example, regarding a frame of a video image distributed via a network N, information indicating vectors of movements regarding respective subareas obtained by dividing the frame of the video image into a plurality of areas. The estimation unit 12 estimates a position of an area of a specific part of a subject in the frame based on the information indicating the vectors of the movements acquired by the acquisition unit 11. The control unit 13 executes various kinds of processes based on the image captured by the image-capturing apparatus 20 and distributed. The control unit 13 causes a coding parameter which is based on the position of the area of the specific part estimated by the estimation unit 12 to be set for the frame. The coding parameter which is based on the position of the area of the specific part may include, for example, at least one of a bit rate of coding, a frame rate of coding, or a quantization parameter (QP value) of coding for each of the subareas included in the area of the specific part.

Figure 1B:
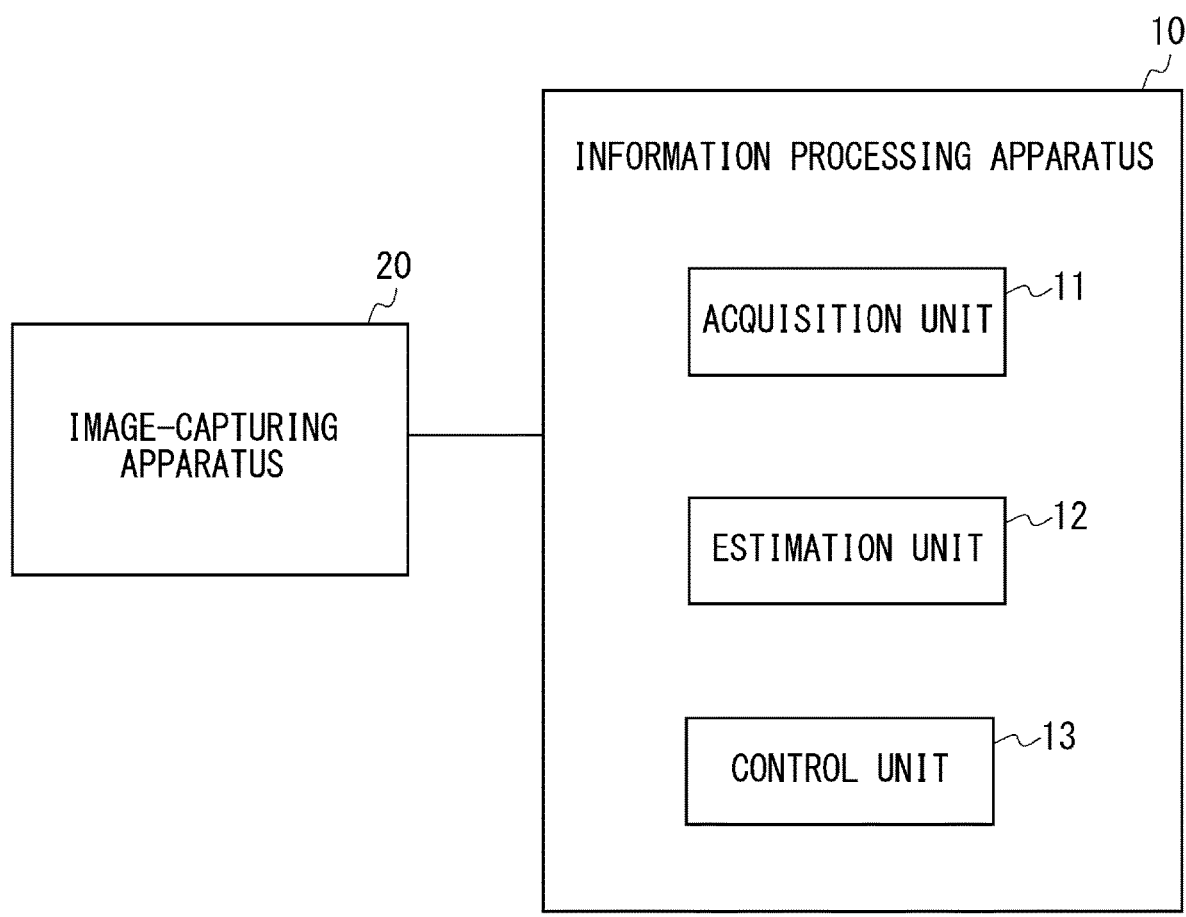
FIG. 1B is a diagram showing one example of a configuration of the information processing system according to the example embodiment.

Further, the acquisition unit 11, the estimation unit 12, and the control unit 13 may be aggregated as a single apparatus, as shown in FIG. 1B. In the example shown in FIG. 1B, the information processing system 1 includes an information processing apparatus 10 and an image-capturing apparatus 20. The image-capturing apparatus 20 is an apparatus that photographs a subject, and may be, for example, a camera built into a smartphone, a tablet or the like. Alternatively, the image-capturing apparatus 20 may be, for example, a camera connected to a personal computer or the like by an external bus. The information processing apparatus 10 includes the acquisition unit 11, the estimation unit 12, and the control unit 13. These units may be implemented by cooperation of one or more programs installed in the information processing apparatus 10 and hardware such as a processor 101 and a memory 102 of the information processing apparatus 10.

<Processes>

Figure 2A:
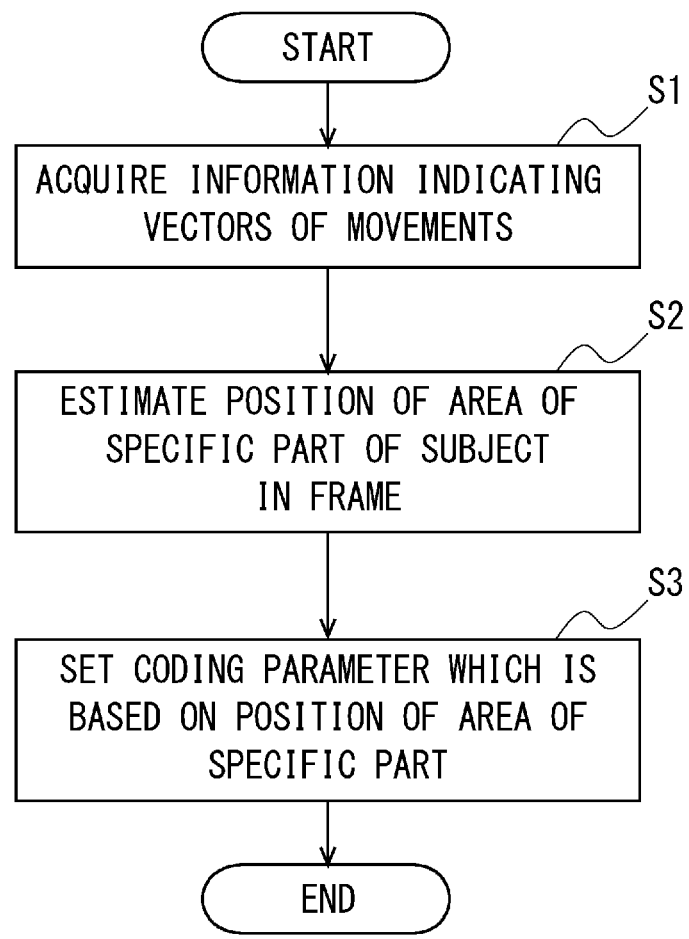
FIG. 2A is a flowchart showing one example of processing of the information processing system according to the example embodiment.
Figure 2B:
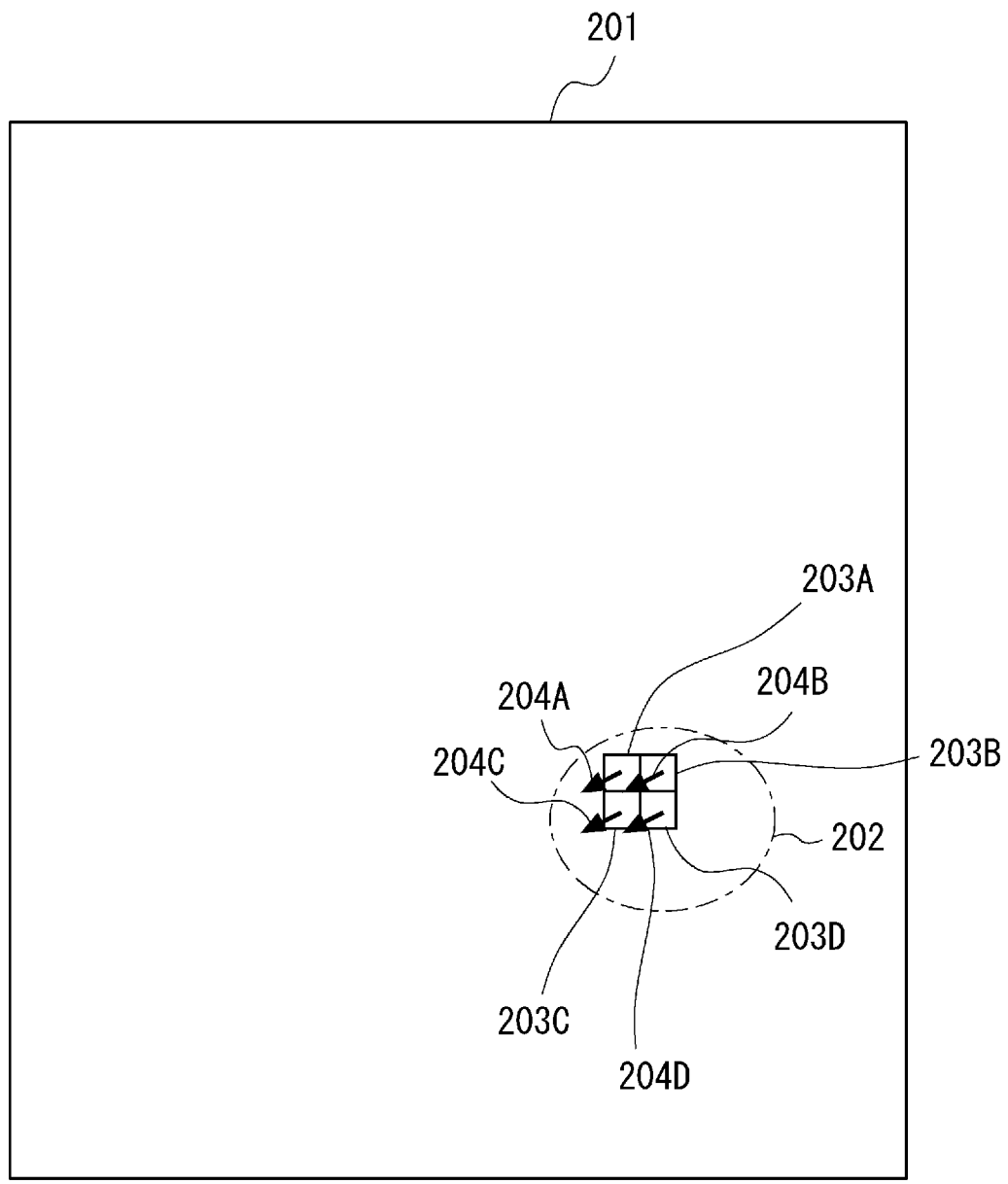
FIG. 2B is a diagram showing an example of subareas and motion vectors in a frame according to the example embodiment.

Referring next to FIGS. 2A and 2B, one example of processes in the information processing system 1 according to the example embodiment will be described. FIG. 2A is a flowchart showing one example of the processes in the information processing system 1 according to the example embodiment. FIG. 2B is a diagram showing an example of subareas and motion vectors in a frame according to the example embodiment.

In Step S1, the acquisition unit 11 acquires, for example, for a frame of a video image coded by a predetermined coding scheme, information indicating vectors of movements of respective subareas, the subareas being obtained by dividing the frame into a plurality of areas. This coding scheme may include, for example, H.265/High Efficiency Video Coding (HEVC), AO Media Video 1 (AV1), H.264/MPEG-4 Advanced Video Coding (AVC), and the like. Further, each of the subareas may be, for example, a macroblock of coding or a Predicted Unit (PU) of coding. Further, the information indicating the vectors of the movements may be, for example, Motion Vectors (MVs) used in motion compensation (MC) in inter-frame prediction of coding.

Next, the estimation unit 12 estimates a position of an area of a specific part of a subject in a frame based on the information indicating the vectors of the movements acquired by the acquisition unit 11 (Step S2). FIG. 2B shows an example of respective subareas 203A-203D included in an area 202 of a specific part and motion vectors 204A-204D of the respective subareas 203A-203D in a frame 201 included in a video image. The estimation unit 12 may estimate, for example, an area on pixel coordinates obtained by moving the subarea 203A in the direction and by the amount indicated by the motion vector 204A as an area of the subarea 203A in a frame next to the frame 201. Likewise, the estimation unit 12 may estimate an area on pixel coordinates obtained by moving the respective subareas 203B-203D in the directions and by the amounts indicated by the respective motion vectors 204B-204D as the respective areas of the subareas 203B-203D in the next frame. Then, the estimation unit 12 may estimate, for example, an area including the respective areas of the subareas 203A-203D in the next frame as the area of the specific part in the next frame.

Next, the control unit 13 causes a coding parameter which is based on the estimated position of the area of the specific part to be set for the frame (Step S3). Here, the control unit 13 causes, for example, the area of the specific part in a frame next to the frame 201 to be coded with a specific image quality. Accordingly, it is possible to code, for example, the area of the specific part (area of interest) to be used for analysis with an image quality (e.g., a bit rate, a frame rate, or a QP value) higher than that in the other area (an area other than the specific part) and distribute the obtained video image.

<Hardware Configuration>

Figure 3:
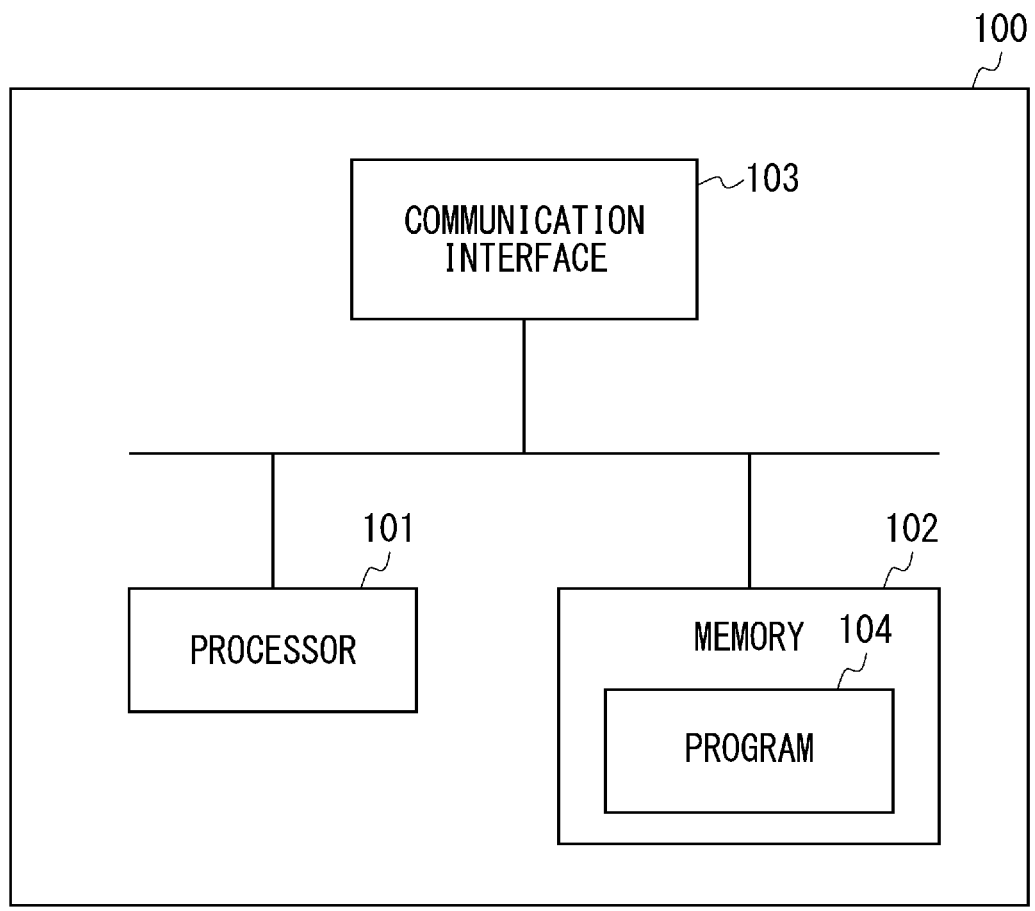
FIG. 3 is a diagram showing a configuration example of the information processing system according to the example embodiment.

FIG. 3 is a diagram showing an example of a hardware configuration of the information processing apparatus 10 according to the example embodiment. In the example shown in FIG. 3, the information processing apparatus 10 (a computer 100) includes a processor 101, a memory 102, and a communication interface 103. These units may be connected by a bus or the like. The memory 102 stores at least a part of a program 104. The communication interface 103 includes an interface necessary for communication with other network elements.

When the program 104 is executed by cooperation of the processor 101, the memory 102, and the like, the computer 100 performs at least a part of processing of the example embodiment of the present disclosure. The memory 102 may be of any type suitable for a local technical network. The memory 102 may be, by way of non-limiting example, a non-transitory computer readable storage medium. Further, the memory 102 may be implemented using any suitable data storage technology, such as semiconductor based memory devices, magnetic memory devices and systems, optical memory devices and systems, fixed memory and removable memory, as non-limiting examples. While only one memory 102 is shown in the computer 100, there may be several physically distinct memory modules in the computer 100. The processor 101 may be of any type. The processor 101 may include one or more of general purpose computers, special purpose computers, microprocessors, digital signal processors (DSPs) and processors based on multicore processor architecture, as non-limiting examples. The computer 100 may have multiple processors, such as an application specific integrated circuit chip that is slaved in time to a clock which synchronizes the main processor.

The example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method according to the present disclosure. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus. The program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

The program can be stored and provided to a computer using any type of non-transitory computer readable media. Non-transitory computer readable media include any type of tangible storage media. Examples of non-transitory computer readable media include magnetic storage media, optical magnetic storage media, optical disc media, semiconductor memories, etc. The magnetic storage media include, for example, flexible disks, magnetic tapes, hard disk drives, etc. The optical magnetic storage media include, for example, magneto-optical disks. The optical disc media include, for example, a Blu-ray disc, a Compact Disc (CD)-Read Only Memory (ROM), CD-Recordable (R), CD-ReWritable (RW), etc. The semiconductor memories include, for example, solid state drive, mask ROM, Programmable ROM (PROM), Erasable PROM (EPROM), flash ROM, random access memory (RAM), etc. The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Second Example Embodiment

<System Configuration>

Figure 4:
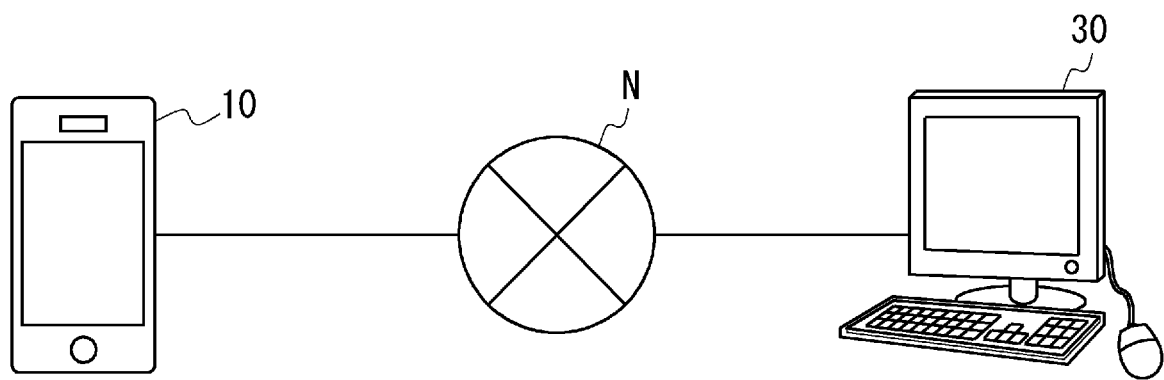
FIG. 4 is a diagram showing an example of a hardware configuration of an information processing apparatus according to the example embodiment.

Referring next to FIG. 4, a configuration of an information processing system 1 according to an example embodiment will be described. FIG. 4 is a diagram showing a configuration example of the information processing system 1 according to the example embodiment. In the example shown in FIG. 4, the information processing system 1 includes an information processing apparatus 10 including an image-capturing apparatus 20, and a distribution destination apparatus 30. Note that the number of information processing apparatuses 10 and the number of distribution destination apparatuses 30 are not limited to those shown in the example in FIG. 4.

Note that the technique according to the present disclosure may be used, for example, for measurement of biological information based on an image of a patient (a human being or an animal) in a video conference (a video call or an online medical examination) between a doctor and the patient. The technique according to the present disclosure may also be used, for example, for analysis (specification) of a person and analysis (estimation) of behavior based on images in a monitoring camera. The technique according to the present disclosure may also be used, for example, for analysis (testing) of a product based on images of a monitoring camera installed in a factory or a plant.

In the example shown in FIG. 4, the information processing apparatus 10 and the distribution destination apparatus 30 are connected to each other in such a way that they can communicate with each other via a network N. The network N includes, for example, the Internet, a mobile communication system, wireless Local Area Network (LAN), Wi-Fi (registered trademark), LAN, a short-range wireless communication such as Bluetooth (registered trademark) Low Energy (BLE), and the like. The mobile communication system includes, for example, the fifth generation mobile communication system (5G), local 5G, Beyond 5G (6G), the fourth generation mobile communication system (4G), Long Term Evolution (LTE), the third generation mobile communication system (3G), and the like.

The information processing apparatus 10 may be, for example, an apparatus including a smartphone, a tablet, a personal computer or the like. The information processing apparatus 10 codes an image (including a still image and a moving image (a video image)) captured by the image-capturing apparatus (camera) 20 provided inside or outside of the information processing apparatus 10 by any coding scheme and distributes the coded image to the distribution destination apparatus 30 via the network N. This coding scheme may include, for example, H.265/High Efficiency Video Coding (HEVC), AO Media Video 1 (AV1), H.264/MPEG-4 Advanced Video Coding (AVC), and the like.

The distribution destination apparatus 30 may be, for example, an apparatus such as a personal computer, a server, a cloud, a smartphone, or a tablet. The distribution destination apparatus 30 may perform an analysis based on the image distributed from the information processing apparatus 10. Further, the distribution destination apparatus 30 may cause a distributed video image after being decoded to be displayed on the display device. Accordingly, a doctor or the like may visually analyze patient information remotely.

<Processes>

Figure 5:
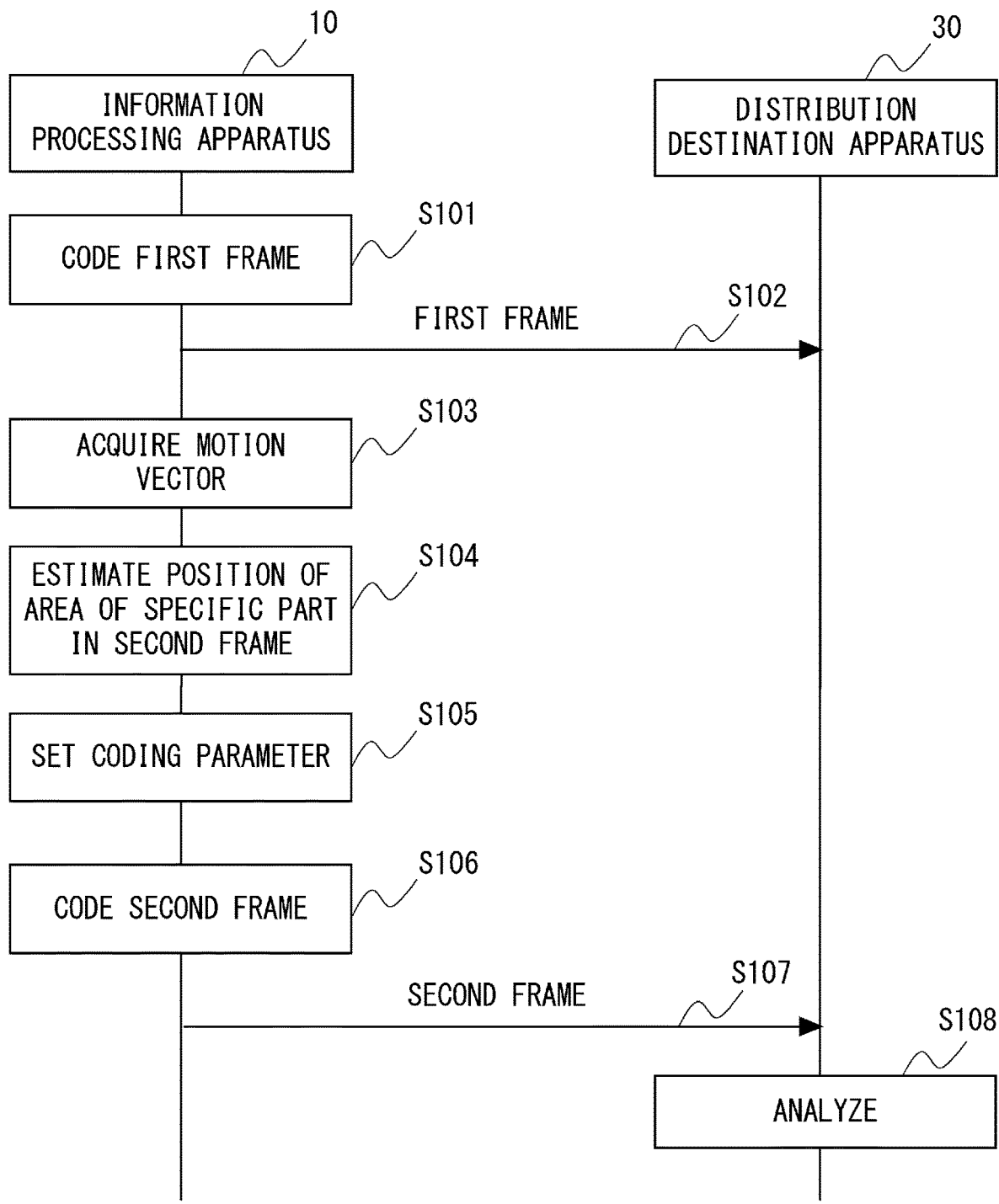
FIG. 5 is a sequence diagram showing one example of processes of an information processing system according to the example embodiment.
Figure 7:
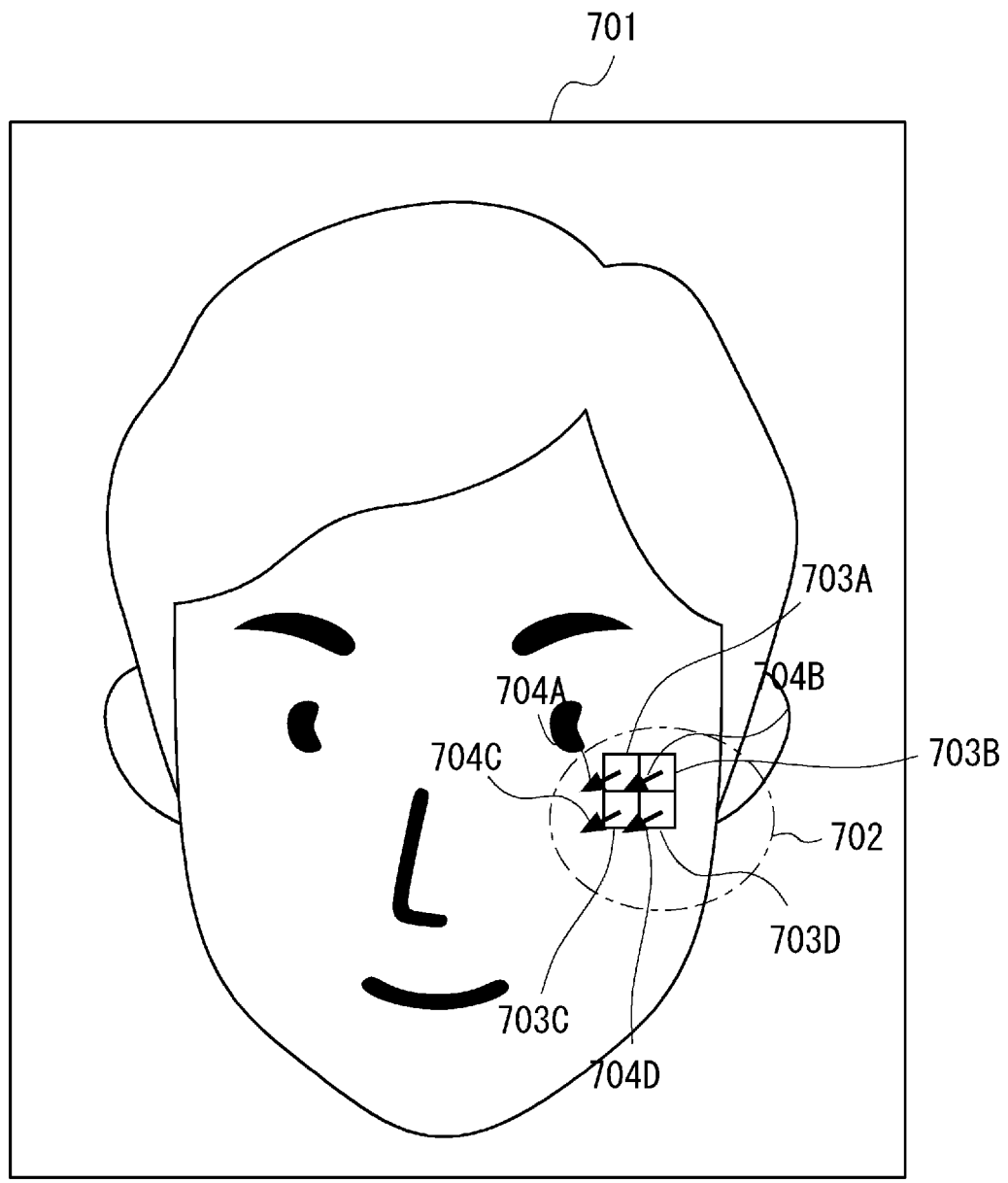
FIG. 7 is a diagram showing an example of motion vectors of the respective subareas in a first frame according to the example embodiment.
Figure 8:
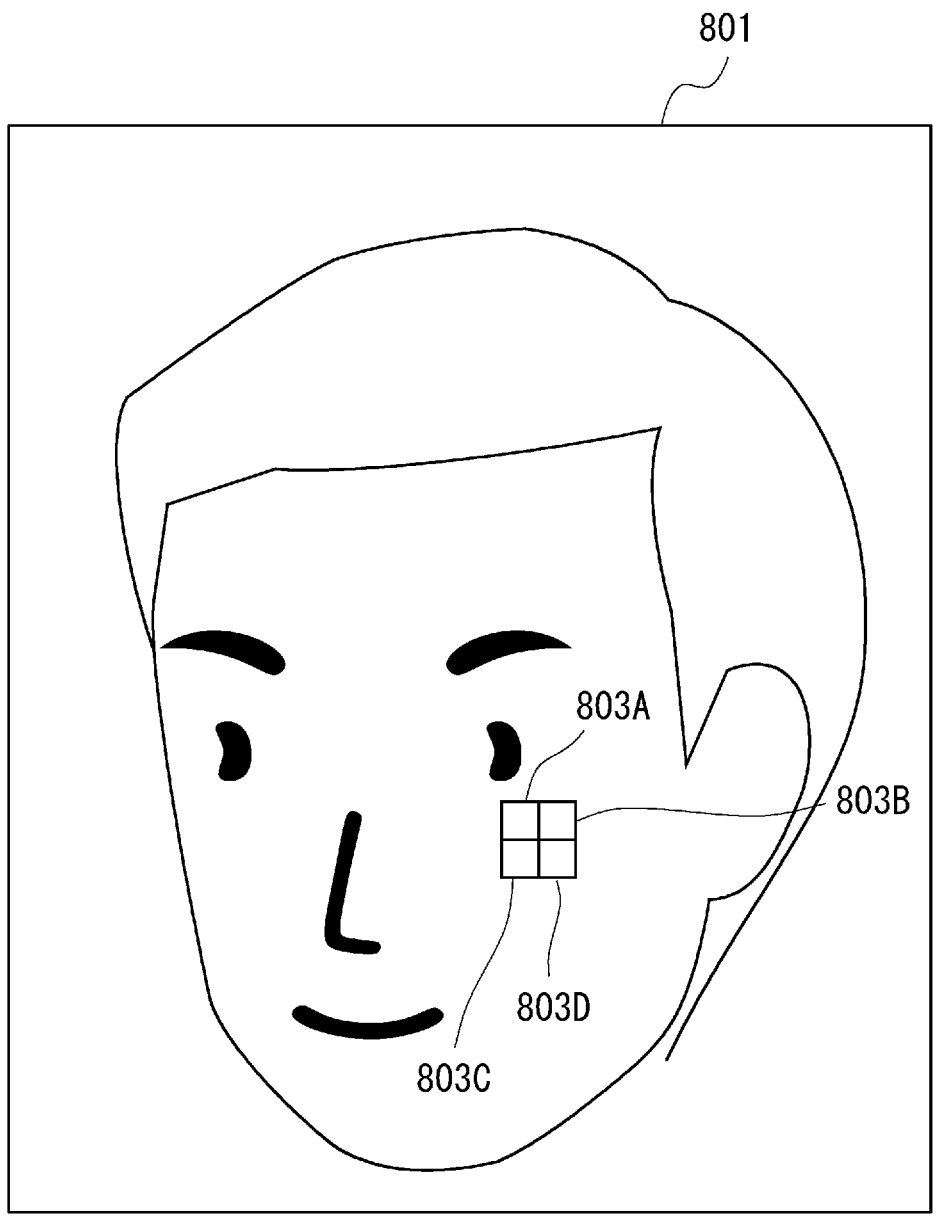
FIG. 8 is a diagram showing an example of estimation positions in a second frame of subareas in the first frame according to the example embodiment.
Figure 9:
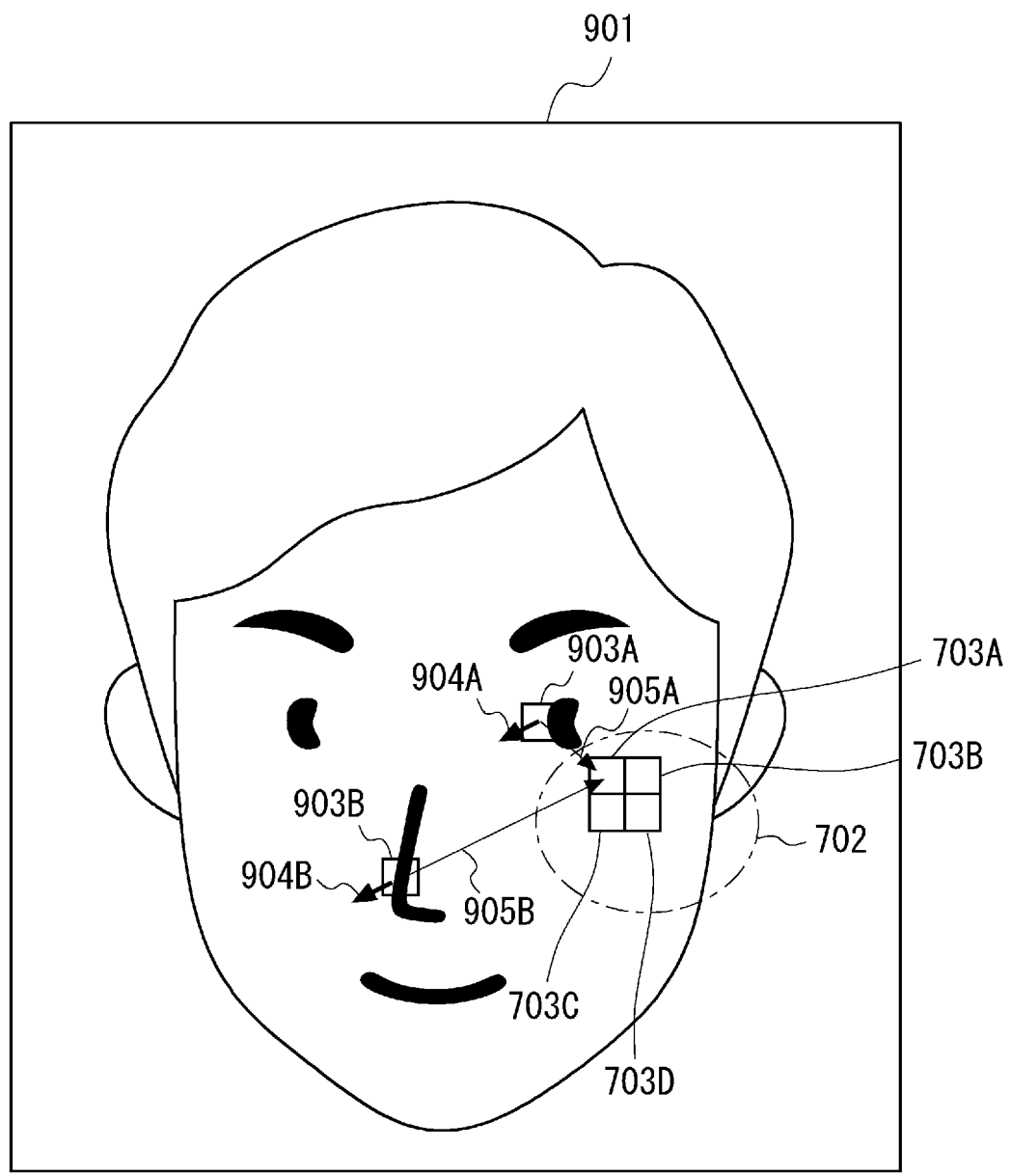
FIG. 9 is a diagram showing an example of motion vectors of the respective subareas in the first frame according to the example embodiment.
Figure 10:
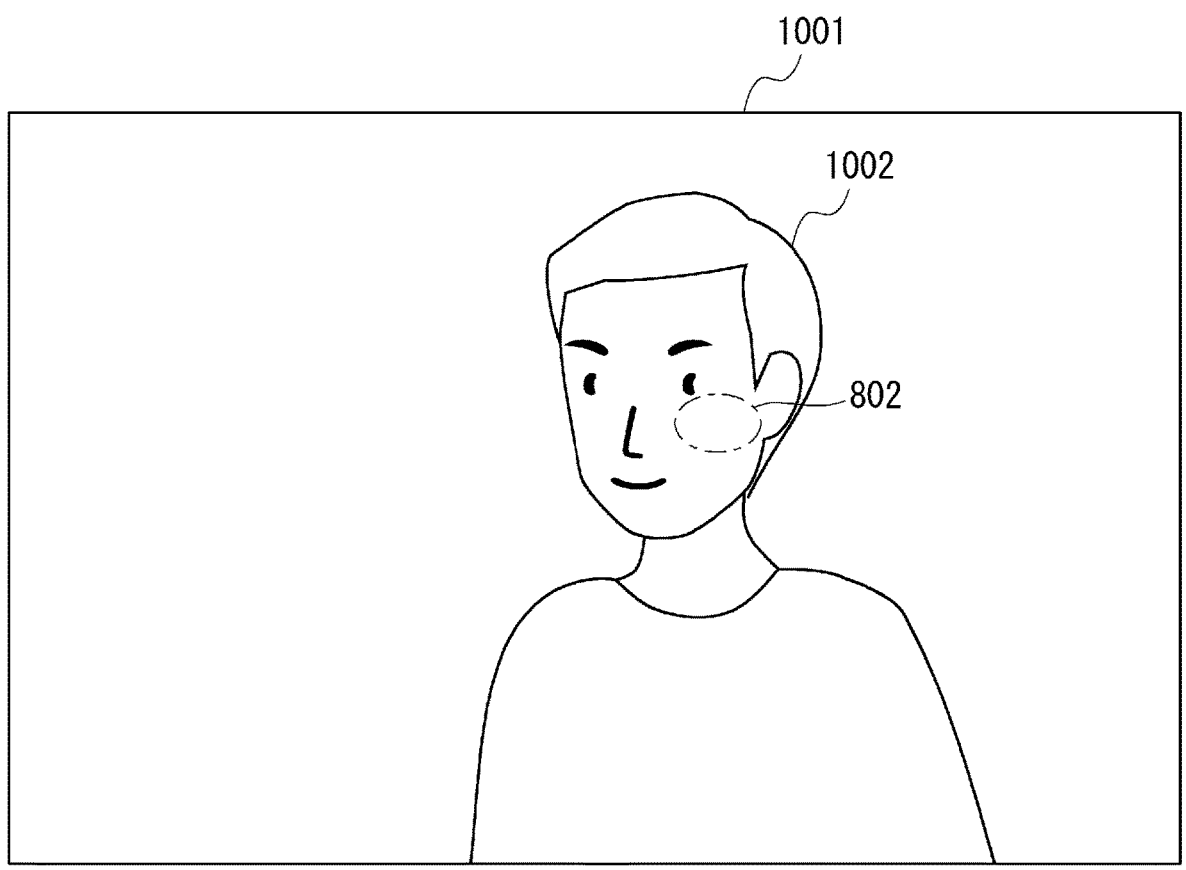
FIG. 10 is a diagram showing an example of a distributed video image according to the example embodiment.

Referring next to FIGS. 5 to 10, one example of processes of the information processing system 1 according to the example embodiment will be described. FIG. 5 is a sequence diagram showing one example of processes of the information processing system 1 according to the example embodiment. FIG. 6 is a diagram showing one example of a specific part database (DB) 601 according to the example embodiment. FIG. 7 is a diagram showing an example of motion vectors of respective subareas in a first frame according to the example embodiment. FIG. 8 is a diagram showing an example of an estimation position in a second frame of the respective subareas of the first frame according to the example embodiment. FIG. 9 is a diagram showing an example of motion vectors of the respective subareas in the first frame according to the example embodiment. FIG. 10 is a diagram showing an example of a distributed video image according to the example embodiment.

Hereinafter, as one example, a case where a medical examination or measurement of biological information based on a patient's image is performed in a video conference (a video call or an online medical examination) between a doctor and the patient will be described. In the following description, it is assumed that a process of establishing a video conference session or the like between the information processing apparatus 10 of the patient and the distribution destination apparatus 30 of the doctor has already been ended.

In Step S101, the control unit 13 of the information processing apparatus 10 causes the first frame of the video image captured by the image-capturing apparatus 20 to be coded. Here, the control unit 13 of the information processing apparatus 10 may cause, for example, an area of a specific part (e.g., eye, mouth, cheek, or the like) of the subject in the first frame to be coded with a specific image quality. Further, the control unit 13 of the information processing apparatus 10 may cause, for example, the area other than the area of the specific part of the subject in the first frame to be coded with an image quality lower than the specific image quality. Accordingly, it is possible to reduce the bandwidth used by the network N to distribute the video image.

Note that the above specific part may be specified, for example, by a doctor. In this case, the distribution destination apparatus 30 may be specified, for example, by an operation or the like of surrounding a specific part of the patient by dragging this part by a mouse or the like on a display screen of the video image of the patient. Further, the distribution destination apparatus 30 may be specified (selected) by a doctor from a list of specific parts of the subject. Further, the distribution destination apparatus 30 may be specified (selected) by a doctor from a list of items of the biological information, which are items to be analyzed (hereinafter each of these items may also be referred to as an "analysis target").

Then, the information processing apparatus 10 may receive information indicating the specific part specified by the doctor from the distribution destination apparatus 30. When an item of biological information of the analysis target has been specified, the estimation unit 12 of the information processing apparatus 10 may extract information on the specific part in accordance with the analysis target by referring to, for example, the specific part DB 601. Note that the specific part DB 601 may be stored (registered or set) in a storage apparatus inside the information processing apparatus 10 or may be stored in a DB server or the like provided in the outside of the information processing apparatus 10. In the example shown in FIG. 6, the specific part of the subject is recorded in the image quality change content DB 601 in such a way that the specific part is associated with the item of biological information of the analysis target. In the example shown in FIG. 6, for example, it is specified, for example, that a face area is used when a heart rate is analyzed.

The estimation unit 12 of the information processing apparatus 10 may perform image recognition of the first frame and detect (estimate) an area including a specific part of the subject specified by a doctor or the like. Note that the estimation unit 12 of the information processing apparatus 10 may execute processing for performing image recognition of the area of the specific part at, for example, predetermined time intervals (e.g., every one second). Further, the estimation unit 12 of the information processing apparatus 10 may use a frame that is coded without using inter-frame prediction (Intra-coded Frame (I frame), intraframe, or a keyframe) as the first frame.

Then, the control unit 13 of the information processing apparatus 10 causes the area of the specific part in the first frame to be coded with a specific image quality. Accordingly, it is possible to improve the image quality of the area used for testing and the like. Here, the control unit 13 of the information processing apparatus 10 may cause the area of the specific part in the first frame to be coded with a specific image quality using at least one of a bit rate of coding, a frame rate of coding, or a quantization parameter (QP value) of coding as a specific value. In this case, the control unit 13 of the information processing apparatus 10 may cause, for example, the first frame to be coded using a map (a QP map) that sets a quantization parameter (QP value) of coding by a unit of a specific pixel area (e.g., 16 pixels (height)×16 pixels (width)). Further, when hierarchical coding (SVC, Scalable Video Coding) is used as a coding scheme, the control unit 13 of the information processing apparatus 10 may determine to consider the entire first frame as a base layer and the area of the specific part as an enhancement layer.

Next, the control unit 13 of the information processing apparatus 10 causes the coded first frame to be distributed (transmitted) to the distribution destination apparatus 30 via the network N (Step S102). Next, the acquisition unit 11 of the information processing apparatus 10 acquires information indicating vectors of movements of respective subareas (e.g., macroblocks or Predicted Units (PUs)) obtained by dividing a frame into a plurality of areas (Step S103). Here, the acquisition unit 11 of the information processing apparatus 10 may acquire information indicating the vectors of the movements of the respective subareas obtained by dividing a frame of a video image into a plurality of areas from, for example, a module or the like that performs coding processing inside the information processing apparatus 10. Further, by analyzing the data output as a result of the coding processing, information indicating the vectors of the movements may be acquired.

The acquisition unit 11 of the information processing apparatus 10 may acquire, for example, a motion vector (MV) used in motion compensation (MC) in the inter-frame prediction. Note that the inter-frame prediction is, for example, a system for predicting a frame at a certain timing based on one or more frames photographed at different timings and coding the difference between the image of the frame that has been predicted and the image of the frame photographed at this timing.

Next, the estimation unit 12 of the information processing apparatus 10 estimates the position of the area of the specific part of the subject in the second frame based on the information indicating the vectors of the movements acquired by the acquisition unit 11 (Step S104). Note that the second frame is a frame photographed by the image-capturing apparatus 20 at a timing different from the timing when the first frame is photographed. The second frame may be, for example, a frame (Predicted Frame (P frame)) that is coded using only forward prediction in the inter-frame prediction. Alternatively, the second frame may be a frame (Bi-directional Predicted Frame (B frame)) that is coded as a result of selection of one of forward prediction, backward prediction, or bi-directional prediction.

According to the example embodiment of the present disclosure, it is possible to track the position of the area of the specific part (area of interest) coded with a high quality using information on the subareas and motion vectors used to code the video image. Therefore, for example, compared to the case in which object recognition is performed on the area of the specific part in each frame, throughput and power consumption can be reduced and the speed of processing can be increased. Note that, when object recognition is performed on the area of the specific part in each frame, if the information processing apparatus 10 does not include hardware such as a Graphics Processing Unit (GPU) for performing object recognition, processing of object recognition is executed by a Central Processing Unit (CPU) and software. Therefore, the time required for the processing of the object recognition and power consumption increase. On the other hand, according to the present disclosure, a specific part is tracked using information calculated at the time of coding. Therefore, when the information processing apparatus 10 includes a circuit for coding a video image, such as a smartphone, the tracking processing according to the present disclosure can be executed at a higher speed and with a lower power consumption.

The estimation unit 12 of the information processing apparatus 10 may estimate, for example, the position of the area of the specific part in the second frame based on the motion vectors calculated when the second frame is predicted from the first frame. In this case, the estimation unit 12 of the information processing apparatus 10 may calculate, for example, positions obtained by moving the positions of the respective subareas included in the area of the specific part in the first frame by the directions and the amounts indicated by the motion vectors of the respective subareas. Then, the estimation unit 12 of the information processing apparatus 10 may estimate, for example, the respective calculated positions as positions of the respective subareas in the second frame. When the first frame is a frame coded without using inter-frame prediction, the estimation unit 12 of the information processing apparatus 10 may estimate, for example, the position of the area of the specific part in the second frame based on the motion vectors in the frame coded just before the first frame.

FIG. 7 shows an example of motion vectors 704A-704D of respective subareas 703A-703D included in a cheek area 702 in a part 701 of the first frame. Further, FIG. 8 shows an example of respective areas 803A-803D obtained by moving the respective subareas 703A-703D by the respective motion vectors 704A-704D in a part 801 of the second frame. The estimation unit 12 of the information processing apparatus 10 may estimate, for example, the area 803A on pixel coordinates obtained by moving the subarea 703A in the direction and by the amount indicated by the motion vector 704A as the area in the second frame of the subarea 703A in the first frame.

(Example in which Position to which Specific Part Moves is Estimated Based on Characteristic Part)

The estimation unit 12 of the information processing apparatus 10 may estimate the position of the area of the specific part in the second frame based on motion vectors of respective subareas included in an area of a predetermined part (e.g., eye, noise, or mouth) of the subject in the first frame. Accordingly, even when, for example, the specific part is the cheek or the like and an accuracy of motion vectors of subareas included in the area of the specific part is relatively low since values of respective pixels included in the area of the specific part are relatively close to each other, it is possible to improve the accuracy of the estimation of the position to which the specific part moves.

In the above case, the estimation unit 12 of the information processing apparatus 10 may detect, for example, the area of the predetermined part of the subject in the first frame by image recognition or the like. The estimation unit 12 of the information processing apparatus 10 may calculate, for example, vectors indicating relative positions between the respective subareas included in the area of the predetermined part of the subject in the first frame and the respective subareas included in the area of the specific part.

Then, the estimation unit 12 of the information processing apparatus 10 may calculate, for example, the positions obtained by moving the positions of the respective subareas included in the area of the predetermined part in the first frame by the directions and the amounts indicated by the motion vectors of the respective subareas. Then, the estimation unit 12 of the information processing apparatus 10 may calculate, for example, positions obtained by moving the respective calculated positions in the respective directions and by the amounts indicated by the vectors indicating the aforementioned relative positions. Then, the estimation unit 12 of the information processing apparatus 10 may estimate, for example, the respective calculated positions as the positions of the respective subareas in the second frame.

FIG. 9 shows an example of the motion vectors 704A-704D of the respective subareas 703A-703D included in the cheek area 702, which is the specific part, in the part 701 of the first frame, like in FIG. 7. FIG. 9 further shows an example of a motion vector 904A of a subarea 903A included in an eye area, which is a predetermined part, in the first frame and a motion vector 904B of the subarea 903B included in a nose area, which is a predetermined part, in the first frame. FIG. 9 further shows an example of a vector 905A indicating a relative position from the subarea 903A to the subarea 703A in the first frame and a vector 905B indicating a relative position from the subarea 903B to the subarea 703A in the first frame.

The estimation unit 12 of the information processing apparatus 10 may estimate, for example, the position obtained by moving the position of the subarea 903A by the amount corresponding to the value obtained by adding (composing) the motion vector 904A and the vector 905A as the position of the subarea 703A in the second frame. Further, the estimation unit 12 of the information processing apparatus 10 may estimate, for example, the position obtained by moving the position of the subarea 903B by the amount corresponding to the value obtained by adding the motion vector 904B and the vector 905B as the position of the subarea 703A in the second frame. Further, the estimation unit 12 of the information processing apparatus 10 may estimate, for example, an average value or the like of the position obtained by moving the position of the subarea 903A by the amount corresponding to the value obtained by adding the motion vector 904A and the vector 905A and the position obtained by moving the position of the subarea 903B by the amount corresponding to the value obtained by adding the motion vector 904B and the vector 905B as the position of the subarea 703A in the second frame. Further, the estimation unit 12 of the information processing apparatus 10 may estimate a representative value (e.g., an average value, a most common value, or a median value) of the values obtained by moving the respective positions of the plurality of subareas included in one or more predetermined areas by the amount corresponding to the values obtained by adding the respective motion vectors and the respective vectors indicating the relative positions as the positions of the subareas of the specific part in the second frame.

(Example in which Image Quality in Accordance with Increase or Decrease is Set)

The information processing apparatus 10 may estimate, based on motion vectors, a change in the size on the pixel coordinates of the area of the specific part of the subject in the second frame, and cause a coding parameter which is based on the estimated change in the size of the area of the specific part to be set for the second frame. Accordingly, even in a case where, for example, there is a change in the distance between the subject and the image-capturing apparatus 20, it is possible to distribute an image of a specific part with an appropriate image quality. For example, it is possible to reduce a situation in which bandwidth usage of the network N increases when the subject approaches the image-capturing apparatus 20. Further, it is possible to reduce, for example, a situation in which the accuracy and the like of the analysis in the distribution destination reduces when the subject is away from the image-capturing apparatus 20.

In the above case, the estimation unit 12 of the information processing apparatus 10 may detect, for example, that the size of the area of the specific part is changing based on directions of the motion vectors of the respective subareas included in the area of the specific part. In this case, when, for example, the motion vectors of the respective subareas included in the edges of the area of the specific part are distributed in such a way that they are spread in various directions from the central part of the area of the specific part, the estimation unit 12 of the information processing apparatus 10 may determine that the size of the area of the specific part is increasing. Further, when, for example, the motion vectors of the respective subareas included in the edges of the area of the specific part are distributed in such a way that they indicate the directions toward the central part of the area of the specific part, the estimation unit 12 of the information processing apparatus 10 may determine that the size of the area of the specific part is decreasing.

Further, the estimation unit 12 of the information processing apparatus 10 may calculate, for example, variance of the directions of the motion vectors of the respective subareas included in the area of the specific part, and estimate a degree of the change in the size of the area of the specific part (an increasing rate or a decreasing rate) based on the calculated values. Then, when the area of the specific part in the second frame is larger than that in the first frame, the control unit 13 of the information processing apparatus 10 may make the image quality of the area of the specific part lower as the increasing rate becomes higher. Further, when the area of the specific part in the second frame is smaller than that in the first frame, the control unit 13 of the information processing apparatus 10 may make the image quality of the area of the specific part higher as the decreasing rate becomes higher. Note that the control unit 13 of the information processing apparatus 10 is able to improve the image quality by setting, for example, at least one of a bit rate of coding or a frame rate of coding to be higher (larger). Further, the control unit 13 of the information processing apparatus 10 may improve the image quality by setting, for example, a quantization parameter (QP value) of coding to be smaller.

Next, the control unit 13 of the information processing apparatus 10 sets a coding parameter for the second frame (Step S105). The control unit 13 of the information processing apparatus 10 sets (determines) a coding parameter for coding the estimated position of the area of the specific part of the subject in the second frame with a specific image quality.

Next, the control unit 13 of the information processing apparatus 10 causes the second frame to be coded with the set coded parameter (Step S106). Note that this process may be similar to the process in Step S101. Accordingly, in the second frame as well, it is possible to improve the image quality of the area used for testing or the like, like in the first frame.

Next, the control unit 13 of the information processing apparatus 10 causes the coded second frame to be distributed (transmitted) to the distribution destination apparatus 30 via the network N (Step S107). Note that this process may be similar to the process in Step S102.

Next, the distribution destination apparatus 30 analyzes the information on the subject based on the area of the specific part of the specific image quality in the received video image (Step S108). In the example shown in FIG. 10, in an image 1001 in which the second frame has been decoded, the image of at least a part of a cheek area 802 of a subject 1002 is received with the specific image quality.

The distribution destination apparatus 30 may measure (calculate, infer, or estimate), for example, various kinds of information on the analysis target of the subject by Artificial Intelligence (AI) that uses deep learning or the like. The analysis target may include, for example, at least one of a heart rate, a respiratory rate, blood pressure, swelling, transcutaneous arterial blood oxygen saturation, a pupil size, throat swelling, or a degree of periodontal disease. Note that the analysis target may be specified (selected or set) by a doctor or the like in advance. Further, the distribution destination apparatus 30 may determine one or more analysis targets based on results of a medical history form filled out by a patient in advance on a predetermined website or the like The distribution destination apparatus 30 may estimate a heart rate based on a video image of an area where the patient's skin is exposed (e.g., face area). In this case, the distribution destination apparatus 30 may estimate the heart rate based on, for example, transition (period) of changes in the skin color.

Further, the distribution destination apparatus 30 may estimate a respiratory rate based on a video image of an area of the patient's chest (upper body). In this case, the distribution destination apparatus 30 may estimate the respiratory rate based on, for example, a cycle of shoulder movements.

Further, the distribution destination apparatus 30 may estimate blood pressure based on the video image of the area where the patient's skin is exposed (e.g., face area). In this case, the distribution destination apparatus 30 may estimate the blood pressure based on, for example, the difference between pulse waves estimated from two parts of the face (e.g., forehead and cheeks) and the shapes of these pulse waves.

Further, the distribution destination apparatus 30 may estimate transcutaneous arterial blood oxygen saturation (SpO2) based on the video image of the area where the patient's skin is exposed (e.g., face area). Note that red is easily transmitted when hemoglobin is bonded to oxygen, while blue is insusceptible to the binding of hemoglobin to oxygen. Therefore, the distribution destination apparatus 30 may estimate SpO2 based on, for example, the difference in the degree of change in the blue color and red color of the skin near the cheekbones under the eyes.

Further, the distribution destination apparatus 30 may estimate, for example, a degree of swelling based on an image of the patient's eyelid area. Further, the distribution destination apparatus 30 may estimate, for example, a pupil size (pupil diameter) based on an image of the patient's eye area. Further, the distribution destination apparatus 30 may estimate, for example, throat swelling, a degree of periodontal disease, or the like based on an image of the patient's mouth area.

(Example in which Vehicle is Remotely Monitored by Image of Image-Capturing Apparatus 20)

In the aforementioned example, an example in which an area of a specific part of a patient whose image is distributed with a high image quality is tracked in a video conference between a doctor and the patient and visual testing or measurement of biological information is performed has been described. In the following description, an example in which a vehicle is remotely monitored by an image of an image-capturing apparatus 20, which is a monitoring camera, will be described.

The estimation unit 12 of the information processing apparatus 10 may first detect an area of a characteristic part of each vehicle by image recognition. Here, the estimation unit 12 of the information processing apparatus 10 may extract, for example, a part such as a wheel, a window, a door, characters in an advertisement in which a change in the luminance or the like is large as the above characteristic part. Then, the estimation unit 12 of the information processing apparatus 10 may track each vehicle based on subareas and motion vectors included in the area of the characteristic part of each vehicle in the first frame of the image-capturing apparatus 20. Then, the control unit 13 of the information processing apparatus 10 may set the image quality of this area to be higher than the image quality of the other area. Accordingly, it is possible to distribute, for example, an image of an area of surrounding vehicles or the like captured by a camera installed in a vehicle or an intersection with an image quality higher than that in the other area.

In large vehicles such as buses or trucks, an amount of change in pixel values of side surfaces of the vehicle in each frame is relatively small. Therefore, the vectors (amounts and directions) of the actual movement in the respective subareas often do not match motion vectors calculated during coding. On the other hand, according to the present disclosure, tracking is performed using motion vectors of subareas included in an area of a characteristic part. Therefore, it is possible to perform tracking with a higher accuracy.

(Example in which Ship is Remotely Monitored by Image of Image-Capturing Apparatus 20)

In the following description, an example in which a ship is remotely monitored by an image of an image-capturing apparatus 20, which is a monitoring camera, will be described. The estimation unit 12 of the information processing apparatus 10 may first detect an area of a characteristic part of each ship by image recognition. The estimation unit 12 of the information processing apparatus 10 may extract, for example, a part such as a bridge, a funnel, a mast, a window, or a ship name sign in which a change in the luminance or the like is large as the characteristic part. Then, the estimation unit 12 of the information processing apparatus 10 may track each ship based on subareas and motion vectors included in the area of the characteristic part of each ship in the first frame of the image-capturing apparatus 20. Then, the control unit 13 of the information processing apparatus 10 may make the image quality of this area higher than the image quality of the other area. Accordingly, it is possible to distribute, for example, an image of the area of surrounding ships or the like captured by a camera installed in a ship, a harbor, or the like with an image quality higher than that in the other area.

In large ships such as tankers, an amount of change in pixel values of side surfaces of the ship in each frame is relatively small. Therefore, the vectors (amounts and directions) of the actual movement in the respective subareas often do not match motion vectors calculated during coding. On the other hand, according to the present disclosure, tracking is performed using motion vectors of subareas included in an area of a characteristic part. Therefore, it is possible to perform tracking with a higher accuracy.

(Example in which Person is Specified by Image of Image-Capturing Apparatus 20, which is Monitoring Camera)

In the following description, an example in which a person is specified by an image of an image-capturing apparatus 20, which is a monitoring camera, will be described.

The information processing apparatus 10 may track the area of the person based on subareas and motion vectors of a first frame of the image-capturing apparatus 20, and make the image quality of this area higher than the image quality of the other area.

(Example in which Product is Tested (Checked) by Image of Image-Capturing Apparatus 20)

In the following description, an example in which a product is tested (checked) by an image of an image-capturing apparatus 20, which is a monitoring camera, will be described.

The information processing apparatus 10 may track the area of the specific part of the product based on subareas and motion vectors of a first frame of the image-capturing apparatus 20, and make the image quality of this area higher than the image quality of the other area.

(Example in Which Facility is Checked by Image of Image-Capturing Apparatus 20)

In the following description, an example in which a facility is checked by using an image of an image-capturing apparatus 20 mounted on a drone, a robot that autonomously moves on the ground, or the like will be described. In this case, a video image of the image-capturing apparatus 20 may be distributed from the information processing apparatus 10 mounted on the drone or the like to the distribution destination apparatus 30.

The information processing apparatus 10 may track an area of an object to be checked (e.g., a steel tower, an electric wire, or the like) based on subareas and motion vectors of a first frame of the image-capturing apparatus 20, and make the image quality of this area higher than the image quality of the other area.

Modified Examples

While the information processing apparatus 10 may be an apparatus included in one housing, the information processing apparatus 10 according to the present disclosure is not limited to this example. Each unit of the information processing apparatus 10 may be implemented, for example, by cloud computing constituted by one or more computers. Further, at least some the processes of the information processing apparatus 10 may be implemented, for example, by another information processing apparatus 10. Such an information processing apparatus 10 is also included in one example of the "information processing apparatus" according to the present disclosure.

Note that the present disclosure is not limited to the aforementioned example embodiments and may be changed as appropriate without departing from the spirit of the present disclosure.

The whole or part of the example embodiments disclosed above can be described as, but not limited to, the following supplementary notes.

(Supplementary Note 1)

An information processing system comprising:
acquisition means for acquiring, regarding a frame of a video image distributed via a network, information indicating vectors of movements regarding respective subareas obtained by dividing the frame of the video image into a plurality of areas;
estimation means for estimating a position of an area of a specific part of a subject in the frame of the video image based on the information indicating the vectors of the movements acquired by the acquisition means; and
control means for causing a coding parameter to be set for the frame of the video image based on the position of the area of the specific part estimated by the estimation means.

(Supplementary Note 2)

The information processing system according to Supplementary Note 1, wherein the information indicating the vectors of the movements includes a motion vector when a video image is coded using inter-frame prediction.

(Supplementary Note 3)

The information processing system according to Supplementary Note 1 or 2, wherein the control means causes a coding parameter in which at least one of a bit rate of coding, a frame rate, or a quantization parameter (QP value) of coding for each of the subareas included in the area of the specific part in the frame is used as a specific value to be set.

(Supplementary Note 4)

The information processing system according to any one of Supplementary Notes 1 to 3, wherein the estimation means estimates a position of an area of a specific part in a second frame based on information indicating vectors of movements from positions of respective subareas included in an area of a specific part of the subject in a first frame to positions of respective subareas included in an area of the specific part of the subject in the second frame.

(Supplementary Note 5)

The information processing system according to any one of Supplementary Notes 1 to 4, wherein the estimation means estimates a position of an area of a specific part in a fourth frame based on information indicating vectors of movements from positions of respective subareas included in an area of a predetermined part of the subject in a third frame to positions of respective subareas included in an area of the predetermined part of the subject in the fourth frame.

(Supplementary Note 6)

The information processing system according to any one of Supplementary Notes 1 to 5, wherein
the estimation means estimates a change in the size of the area of the specific part of the subject in the frame based on the information indicating the vectors of the movements acquired by the acquisition means, and
the control means causes a coding parameter which is based on the change in the size of the area of the specific part estimated by the estimation means to be set for the frame.

(Supplementary Note 7)

An information processing method executing:
processing for acquiring, regarding a frame of a video image distributed via a network, information indicating vectors of movements regarding respective subareas obtained by dividing the frame of the video image into a plurality of areas;
processing for estimating a position of an area of a specific part of a subject in the frame of the video image based on the information indicating the vectors of the movements acquired in the acquiring processing; and
processing for causing a coding parameter to be set for the frame of the video image based on the position of the area of the specific part estimated in the estimating processing.

(Supplementary Note 8)

The information processing method according to Supplementary Note 7, wherein the information indicating the vectors of the movements includes a motion vector when a video image is coded using inter-frame prediction.

(Supplementary Note 9)

The information processing method according to Supplementary Note 7 or 8, wherein, in the setting processing, a coding parameter in which at least one of a bit rate of coding, a frame rate, or a quantization parameter (QP value) of coding for each of the subareas included in the area of the specific part in the frame is used as a specific value is caused to be set.

(Supplementary Note 10)

The information processing method according to any one of Supplementary Notes 7 to 9, wherein, in the estimating processing, a position of an area of a specific part in a second frame is estimated based on information indicating vectors of movements from positions of respective subareas included in an area of a specific part of the subject in a first frame to positions of respective subareas included in an area of the specific part of the subject in the second frame.

(Supplementary Note 11)

The information processing method according to any one of Supplementary Notes 7 to 10, wherein, in the estimating processing, a position of an area of a specific part in a fourth frame is estimated based on information indicating vectors of movements from positions of respective subareas included in an area of a predetermined part of the subject in a third frame to positions of respective subareas included in an area of the predetermined part of the subject in the fourth frame.

(Supplementary Note 12)

The information processing method according to any one of Supplementary Notes 7 to 11, wherein
in the estimating processing, a change in the size of the area of the specific part of the subject in the frame is estimated based on the information indicating the vectors of the movements acquired in the acquiring processing, and
in the setting processing, a coding parameter which is based on the change in the size of the area of the specific part estimated in the estimating processing is caused to be set for the frame.

(Supplementary Note 13)

An information processing apparatus comprising:
acquisition means for acquiring, regarding a frame of a video image distributed via a network, information indicating vectors of movements regarding respective subareas obtained by dividing the frame of the video image into a plurality of areas;
estimation means for estimating a position of an area of a specific part of a subject in the frame of the video image based on the information indicating the vectors of the movements acquired by the acquisition means; and
control means for causing a coding parameter to be set for the frame of the video image based on the position of the area of the specific part estimated by the estimation means.

(Supplementary Note 14)

The information processing apparatus according to Supplementary Note 13, wherein the information indicating the vectors of the movements includes a motion vector when a video image is coded using inter-frame prediction.

(Supplementary Note 15)

The information processing apparatus according to Supplementary Note 13 or 14, wherein the control means causes a coding parameter in which at least one of a bit rate of coding, a frame rate, or a quantization parameter (QP value) of coding for each of the subareas included in the area of the specific part in the frame is used as a specific value to be set.

(Supplementary Note 16)

The information processing apparatus according to any one of Supplementary Notes 13 to 15, wherein the estimation means estimates a position of an area of a specific part in a second frame based on information indicating vectors of movements from positions of respective subareas included in an area of a specific part of the subject in a first frame to positions of respective subareas included in an area of the specific part of the subject in the second frame.

(Supplementary Note 17)

The information processing apparatus according to any one of Supplementary Notes 13 to 16, wherein the estimation means estimates a position of an area of a specific part in a fourth frame based on information indicating vectors of movements from positions of respective subareas included in an area of a predetermined part of the subject in a third frame to positions of respective subareas included in an area of the predetermined part of the subject in the fourth frame.

(Supplementary Note 18)

The information processing apparatus according to any one of Supplementary Notes 13 to 17, wherein
the estimation means estimates a change in the size of the area of the specific part of the subject in the frame based on the information indicating the vectors of the movements acquired by the acquisition means, and
the control means causes a coding parameter which is based on the change in the size of the area of the specific part estimated by the estimation means to be set for the frame.

REFERENCE SIGNS LIST

1 INFORMATION PROCESSING SYSTEM
10 INFORMATION PROCESSING APPARATUS
10A INFORMATION PROCESSING APPARATUS
10B INFORMATION PROCESSING APPARATUS
11 ACQUISITION UNIT
12 ESTIMATION UNIT
13 CONTROL UNIT
20 IMAGE-CAPTURING APPARATUS
N NETWORK

What is claimed is:

1. An information processing system comprising:
at least one memory storing instructions; and
at least one processor configured to execute the instructions to:
acquire, regarding a first frame of a video image distributed via a network, information indicating vectors of movements regarding respective subareas obtained by dividing the first frame of the video image into a plurality of areas;
calculate vectors indicating relative positions between the respective subareas included in an area of a predetermined part of a subject in the first frame and the respective subareas included in an area of a specific part of a subject;
estimate a position of an area of the specific part of the subject in a second frame of the video image based on (i) the information indicating the vectors of movements from the positions of the respective subareas of the predetermined part in the first frame to the positions of the respective subareas of the predetermined part in the second frame, and (ii) the vectors indicating the relative positions; and cause a coding parameter to be set for the second frame of the video image based on the estimated position of the area of the specific part,
wherein the specific part is an analysis target of the subject,
and the predetermined part is a characteristic element of the subject, different from the specific part.

2. The information processing system according to claim 1, wherein the information indicating the vectors of the movements includes a motion vector when the video image is coded using inter-frame prediction.

3. The information processing system according to claim 1, wherein the coding parameter uses at least one of a bit rate of coding, a frame rate, or a quantization parameter (QP value) of coding for each of the subareas included in the area of the specific part in the second frame as a specific value.

4. The information processing system according to claim 1, wherein the at least one processor is configured to estimate the position of the area of the specific part in the second frame based on the information indicating the vectors of movements from positions of the respective subareas included in the area of the specific part of the subject in the first frame to positions of the respective subareas included in the area of the specific part of the subject in the second frame.

5. The information processing system according to claim 1, wherein the at least one processor is configured to estimate a position of an area of the specific part in a fourth frame based on information indicating vectors of movements from positions of respective subareas included in an area of the predetermined part of the subject in a third frame to positions of respective subareas included in an area of the predetermined part of the subject in the fourth frame.

6. The information processing system according to claim 1, wherein
the at least one processor is configured to estimate a change in a size of the area of the specific part of the subject in the second frame based on the information indicating the vectors of the movements, and
the coding parameter is based on the change in the size of the area of the specific part.

7. An information processing method executing:
processing for acquiring, regarding a first frame of a video image distributed via a network, information indicating vectors of movements regarding respective subareas obtained by dividing the frame of the video image into a plurality of areas;
processing for calculating vectors indicating relative positions between the respective subareas included in an area of a predetermined part of a subject in the first frame and the respective subareas included in an area of a specific part of a subject;
processing for estimating a position of an area of the specific part of the subject in a second frame of the video image based on (i) the information indicating the vectors of movements from the positions of the respective subareas of the predetermined part in the first frame to the positions of the respective subareas of the predetermined part in the second frame, and (ii) the vectors indicating the relative positions; and
processing for causing a coding parameter to be set for the second frame of the video image based on the position of the area of the specific part estimated in the estimating processing,
wherein the specific part is an analysis target of the subject, and the predetermined part is a characteristic element of the subject, different from the specific part.

8. The information processing method according to claim 7, wherein the information indicating the vectors of the movements includes a motion vector when the video image is coded using inter-frame prediction.

9. The information processing method according to claim 7, wherein the coding parameter uses at least one of a bit rate of coding, a frame rate, or a quantization parameter (QP value) of coding for each of the subareas included in the area of the specific part in the second frame as a specific value.

10. The information processing method according to claim 7, wherein, in the estimating processing, the position of the area of the specific part in the second frame is estimated based on the information indicating vectors of movements from positions of the respective subareas included in the area of the specific part of the subject in the first frame to positions of the respective subareas included in the area of the specific part in the second frame.

11. The information processing method according to claim 7, wherein, in the estimating processing, the position of the area of the specific part in a fourth frame is estimated based on information indicating vectors of movements from positions of the respective subareas included in the area of the predetermined part of the subject in a third frame to positions of the respective subareas included in the area of the predetermined part of the subject in the fourth frame.

12. The information processing method according to claim 7, wherein
in the estimating processing, a change in a size of the area of the specific part of the subject in the second frame is estimated based on the information indicating the vectors of the movements acquired in the acquiring processing, and
the coding parameter is based on the change in the size of the area of the specific part.

13. An information processing apparatus comprising:
at least one memory storing instructions; and
at least one processor configured to execute the instructions to:
acquire, regarding a first frame of a video image distributed via a network, information indicating vectors of movements regarding respective subareas obtained by dividing the first frame of the video image into a plurality of areas;
calculate vectors indicating relative positions between the respective subareas included in an area of a predetermined part of a subject in the first frame and the respective subareas included in an area of a specific part of a subject;
estimate a position of an area of the specific part of the subject in a second frame of the video image based on (i) the information indicating the vectors of movements from the positions of the respective subareas of the predetermined part in the first frame to the positions of the respective subareas of the predetermined part in the second frame, and (ii) the vectors indicating the relative positions; and
cause a coding parameter to be set for the second frame of the video image based on the estimated position of the area of the specific part,
wherein the specific part is an analysis target of the subject,
and the predetermined part is a characteristic element of the subject, different from the specific part.

14. The information processing apparatus according to claim 13, wherein the information indicating the vectors of the movements includes a motion vector when the video image is coded using inter-frame prediction.

15. The information processing apparatus according to claim 13, wherein the coding parameter uses at least one of a bit rate of coding, a frame rate, or a quantization parameter (QP value) of coding for each of the subareas included in the area of the specific part in the second frame as a specific value.

16. The information processing apparatus according to claim 13, wherein the at least one processor is configured to estimate the position of the area of the specific part in the second frame based on the information indicating the vectors of movements from positions of the respective subareas included in the area of the specific part of the subject in the first frame to positions of the respective subareas included in the area of the specific part of the subject in the second frame.

17. The information processing apparatus according to claim 13, wherein the at least one processor is configured to estimate a position of an area of the specific part in a fourth frame based on information indicating vectors of movements from positions of respective subareas included in an area of the predetermined part of the subject in a third frame to positions of respective subareas included in an area of the predetermined part of the subject in the fourth frame.

18. The information processing apparatus according to claim 13, wherein
the at least one processor is configured to estimate a change in a size of the area of the specific part of the subject in the second frame based on the information indicating the vectors of the movements, and
the coding parameter is based on the change in the size of the area of the specific part.

* * * * *